Jan. 19, 1937. W. F. BUCK 2,068,226
CHANGEABLE EXHIBITOR
Filed July 24, 1935 5 Sheets-Sheet 1

Inventor:
Walter F. Buck,
By Emery, Booth, Townsend, Miller & Weidner
Attys

Jan. 19, 1937. W. F. BUCK 2,068,226
CHANGEABLE EXHIBITOR
Filed July 24, 1935 5 Sheets-Sheet 2
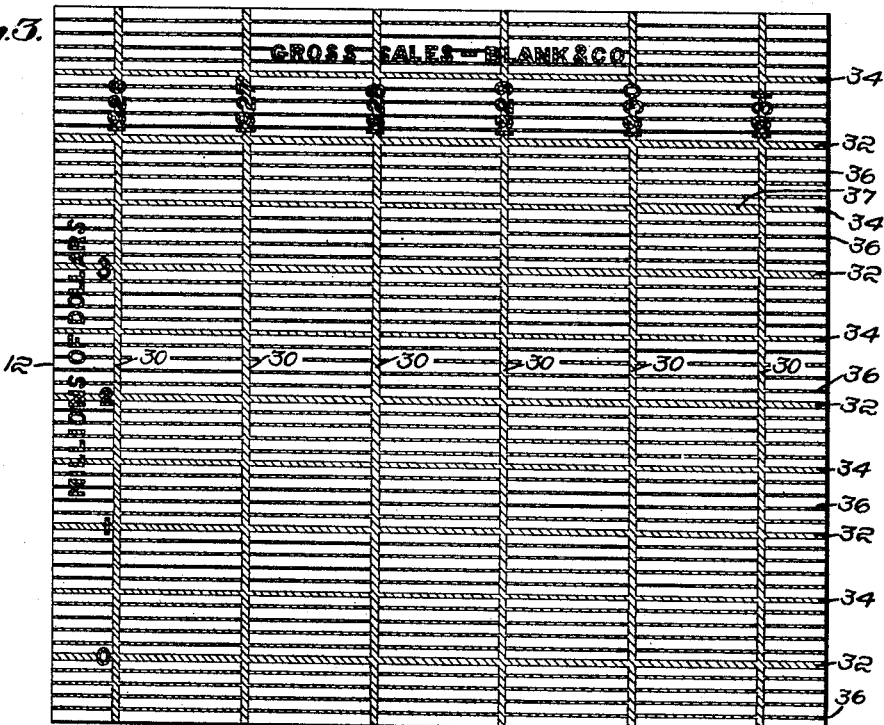
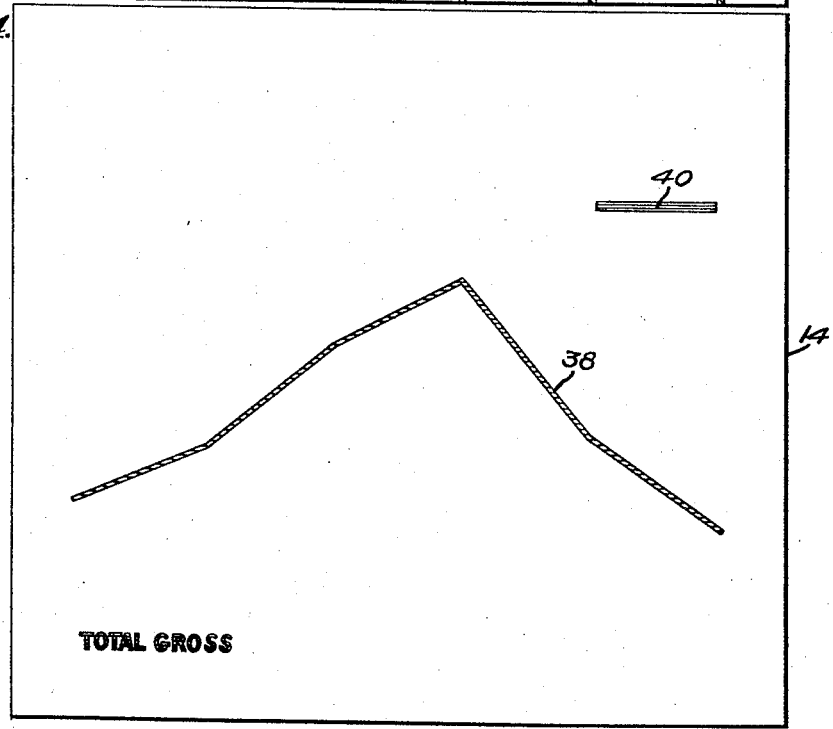
Inventor:
Walter F. Buck,
By Emery, Booth, Townsend, Miller & Weidner
Attys Jan. 19, 1937.　　　W. F. BUCK　　　2,068,226
CHANGEABLE EXHIBITOR
Filed July 24, 1935　　5 Sheets-Sheet 3

Jan. 19, 1937.  W. F. BUCK  2,068,226
CHANGEABLE EXHIBITOR
Filed July 24, 1935  5 Sheets-Sheet 4

Inventor:
Walter F. Buck,
by Emery, Booth, Townsend, Miller & Weidner
Attys

Jan. 19, 1937.  W. F. BUCK  2,068,226
CHANGEABLE EXHIBITOR
Filed July 24, 1935  5 Sheets-Sheet 5

Inventor:
Walter F. Buck,

Patented Jan. 19, 1937

2,068,226

UNITED STATES PATENT OFFICE 2,068,226

CHANGEABLE EXHIBITOR

Walter F. Buck, Brighton, Boston, Mass.

Application July 24, 1935, Serial No. 32,857

7 Claims. (Cl. 35—24)

This invention relates to a novel changeable exhibitor by means of which the relationship between sets of statistical information ordinarily represented by figures may be visually compared in the form of graphs. For example, let it be supposed that it is desired to compare information concerning the relationship between two or more investment securities, such as bonds, in respect to sales over a given period of time, or between production and sales of commodities over a given period of time. The two factors, such as sales and time, for example, are represented by a graph which may be either a "curve," "broken line," or a "bar" graph inscribed upon a transparent plate, and one or more of these plates may be superimposed upon a background having thereon coordinates representing sales in terms of money and time, by means of which the graphs on the transparent plates may be interpreted.

Combined with the background and the transparent plates is means such as a support, herein in the nature of a frame, by means of which the plates and the background may be instantly and accurately assembed, and the plates maintained in proper relationship to each other and to the background for comparison. Provision is made for the placing of the plates in various relationships to each other and to the background. One such relationship may be termed a "normal" position, and to predetermine this position suitable means are provided. One such means is a mark on the background and corresponding marks on the transparent plates, all of which marks, when coincident or registering with one another, establish a "normal" relationship between the graphs and the background by which the graphs are to be interpreted. Another such means is provided on the support and it registers the background and the plates by simply placing the background and the plates against an abutment on the support.

Sometimes it is desirable to shift a plate or plates in relation to the background to obtain a different relationship between the graph or graphs and the background. For this purpose, the plates are shiftable in relation to the background, and means are provided to predetermine the relative positions so that the time factor, for example, of the plates is maintained always in the same relationship, while the other factor, such as sales, on one or more plates may be shifted in relation to the background and to the other plate. For this purpose, the hereinbefore described marks on the plates are brought into play to enable the graph on a given plate to be placed in a new position in respect to the background by shifting the plate to carry the mark thereon out of coincidence or registration with the mark on the background. This new position of the mark on the plate is definitely determined by a mark such as one of the coordinates on the background, and different settings may be obtained by registering the mark on the plate with different coordinates. When one plate is shifted with respect to the other and to the background as hereinbefore described, the zero position of the graph on the plate that is shifted is dropped from its previous position, whether previously coincident or out of registration with the zero position of the graph on the other plate. Figures may be associated with the respective coordinates, constituting, for example, a scale of values in terms of money.

By thus shifting a plate to change the relationship between the graph thereon and the graph on another plate, an average or mean between the "ordinates" of the graphs may be established as an aid in interpreting the significance of the graphs in relation to each other by the aid of the background.

The coordinates are placed upon the background only, and as there are none on the plates there is no confusion of lines to interfere with the setting of the plates and the reading of the material. Another factor which is of importance in the ease and rapidity of setting and reading is the fact that, in the example selected for illustration, different colors are employed, one color for the background, another for one plate, and still another for a second plate, and so on, depending upon the number of plates which are used. The background need not necessarily be separate from the support or frame, though in the present example it is separate so that other backgrounds interchangeable therewith, but having different characteristics, such as coordinates, may be substituted for it.

The invention will best be understood by reference to the following description when taken in connection with the accompanying drawings of certain specific embodiments thereof, while its scope will be pointed out more particularly in the appended claims.

In the drawings:

Fig. 3 is a plan of a background having material thereon to enable the graphs on the plate or plates to be interpreted;

Fig. 4 is a plan of one of the plates;

Figure 1:
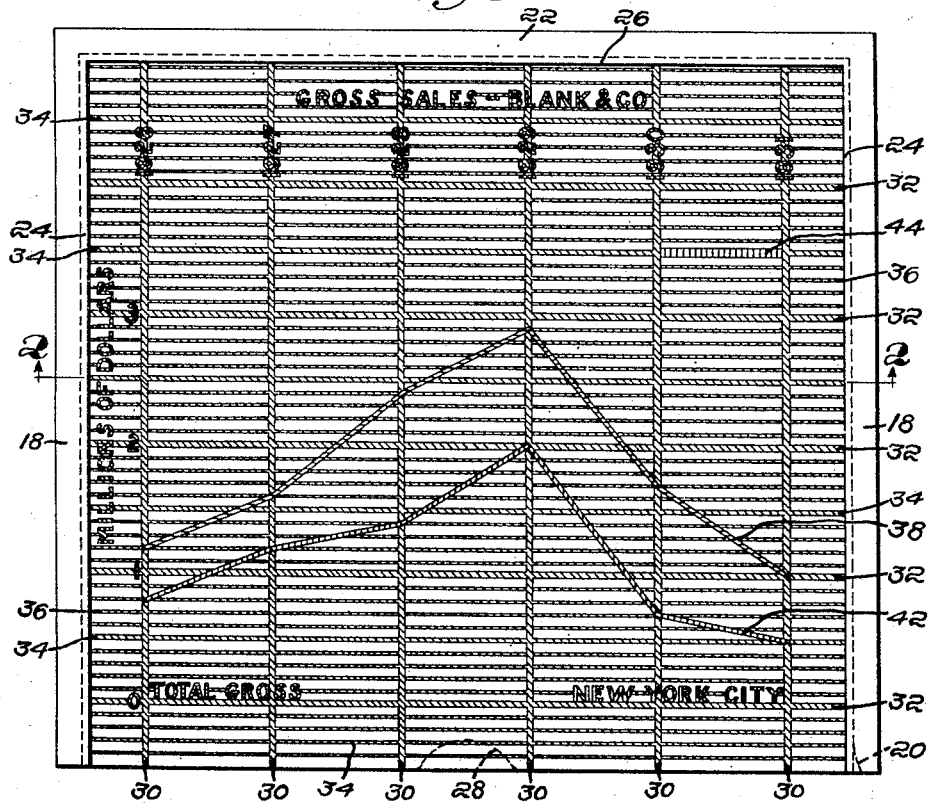
Fig. 1 is a plan of a changeable exhibitor embodying the invention.
Figure 2:
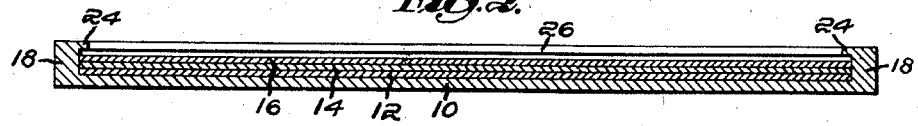
Fig. 2 is a sectional view on line 2—2 of Fig. 1.

Referring to the drawings and to the embodiment of the invention illustrated therein by way of example, there is shown a changeable exhibitor comprising a support 10, a background 12, and two transparent plates 14 and 16. The support is provided with appropriate means by which the plates and the background may be instantly and accurately assembled, and the plates maintained in proper relationship to each other and to the background for comparison. In the construction shown by way of example, the support is in the nature of a frame provided with lateral guides 18 in which corresponding edges of the background and the plates have a snug sliding fit preventing shifting of the background and the plates transversely of the guides, but providing for sliding movement of the background and the plates lengthwise of the guides. To facilitate introduction of the background and the plates, at least one of the guides, herein the right-hand one, has an angular portion 20 forming a flared entrance.

In the example shown, the support has suitable means, such as an abutment or stop 22, to limit movement of the background and the plates in one direction and thus to establish a "normal" starting point relative position of the background and the plates, while the opposite, fourth side of the support is entirely open for the introduction, relative adjustment, and removal of the background and the plates. In the present embodiment, the abutment 22 is similar to the guides 18 and, in the "normal" position shown in Fig. 1, it is engaged by the upper edges of the background and the plates, thus predetermining their relative positions in one direction.

In the present example, the guides 18 are provided with flanges 24 and the abutment 22 is provided with a similar flange 26, all of which flanges overlie the plates and the background and prevent their escape except at the open edge of the support, though, if desired, these flanges may be omitted. To facilitate the grasping of the background and the plates for sliding and removal, the support, as herein shown, has a finger-receiving recess 28.

The background will now be described, reference being had to Fig. 3 which shows one example. It is not necessary that the background be transparent; in fact, I prefer to make it of opaque material such as bristol board, cardboard or thick paper. Various interchangeable backgrounds may be employed, depending upon the nature of the "background material" desired for comparison with the "plate material." In the one shown by way of example in Fig. 3, the "background material" includes parallel lines 30, herein vertical, equally spaced and representing, for example, periods of time such as years, and a consecutive series of year designations, as 1926 to 1931, inclusive, are associated with the lines. Of course, designations other than time may be employed.

In the example shown, the "background material" includes other lines, herein horizontally disposed, and representing, for example, sales in terms of money, such as dollars. As shown, there are equally spaced lines 32, representing large divisions of money, such as millions of dollars, and they have associated with them a consecutive series of designations, as 0, 1, 2 and 3. Herein, for convenience, the spaces between the lines 32 are divided by other lines. In this instance, there are lines 34, representing half millions, and to distinguish these lines from the lines 32, the lines 34 are narrower or lighter than the lines 32. However, in the case of these and other lines and designations it has been necessary to exaggerate their widths in the drawings, because, as is preferred, they are "lined" to represent a color. In this case, the color selected for the "background material" is green. Other subdivisions are indicated by still narrower or lighter lines 36 representing, for example, hundreds of thousands of dollars.

In the example shown, there is associated with the main division lines the expression "Millions of dollars", referring of course to the associated designations "0, 1, 2, 3," and, at a convenient place, such as at the top, there is the expression "Gross sales", and also, if desired, a further expression such as "Blank & Co.," indicating the concern in question.

Also, in the example shown, the "background material" includes, at a convenient point, a mark such as a short horizontal line 37 which is relatively wide and prominent and which may be used in connection with similar lines, presently to be described, on the plate or plates, to facilitate the placing of the plate or plates in various predetermined positions in relation to the background. Moreover, when these marks are employed, by registering the marks on the plates with that on the background, the "normal" relative position may be established without the aid of the abutment 32, and in fact, the abutment may be omitted, if desired, but I prefer to employ it because it provides a quick and easy means of obtaining the initial, "normal" setting of the plate or plates in reference to the background. As already indicated, all of the "background material" is preferably of one color (except, perhaps, notations such as scaling, dating and so on, which might be in black or in some color distinctive from the cross-section), thereby instantly and clearly distinguishing it from the "plate material" which, as will appear, is of another color or colors.

One of the plates will now be described, reference being had to Fig. 4. It will be remembered that the plates are transparent, so that when superimposed upon one another and upon the background all of the material on the background and on the plates may be read as easily as if it were on one chart. The substance of the plates is, for example, some appropriate material such as clear, transparent celluloid. The plate 14 shown in Fig. 4 is provided with appropriate "plate material" such as a graph, herein a "curve" 38 which may be a true curve, if desired, but as herein shown is made up of straight lines extending from point to point, the points corresponding to the year lines 30 on the background. In fact, the points alone might be used and the straight, connecting portions of the line omitted, but the so-called "curve" graph is somewhat easier to read.

The "plate material," as herein shown, includes also an expression such as "Total gross" indicating that the curve shows the fluctuations of the total gross sales by Blank & Co., for each of the years indicated. The plate material further includes a mark such as a line 40 which, as already indicated, will, in the "normal" position of the plate, register with the similar line 37 on the background. When, however, the plate is shifted to the desired extent, determined by placing the line 40 on one of the money division lines of the background, the curve 38 on the plate will be differently related to the money scale on the background. This enables the graph on the plate to be interpreted in another way by the aid of the background material.

In the case of the plate 14, another color, such as blue, is chosen, and it is so represented in the conventional manner by being "lined" for blue. Thus the "plate material" is quickly and easily distinguished from the "background material" and from the "plate material" of any other plate or plates for which another or other colors are selected.

Figure 5:
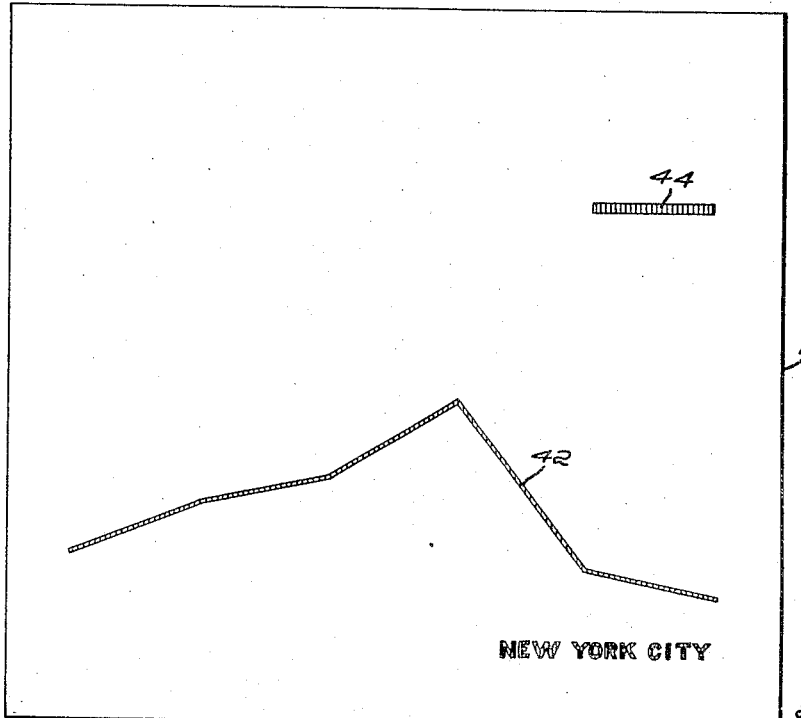
Fig. 5 is a plan of another plate.

Fig. 5 shows a second plate 16, also transparent, and carrying material such as a "curve" 42, a line 44 similar to the line 40 and for a like purpose, and an expression such as "New York city," indicating that the "curve" represents sales effected by Blank & Co. within New York city for the years indicated. This background material is "lined" to represent another color, such as red, easily and quickly distinguishing it from the background which is green and the other plate which is blue. Any desired number of plates may be employed and may be compared. In fact, the invention contemplates the use of a large number of plates, kept on hand, and that can be interchanged or substituted for others, so that comparisons may be made between the financial statistics (such as gross and net earnings, operating expenses, interest charges, rentals, taxes, etc. and per share capitalization and earnings, etc.) of a large number of corporations by the aid of an appropriate background.

Figure 6:
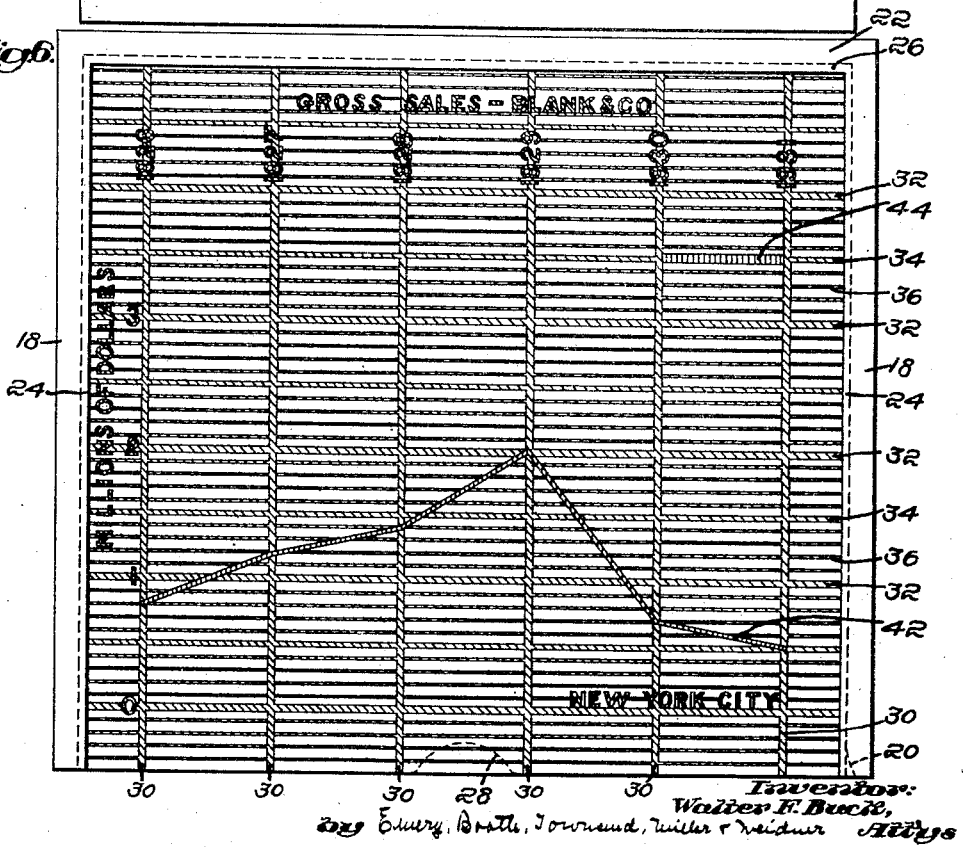
Fig. 6 is a plan of the frame, the background and one of the plates in their "normal" relative position.
Figure 7:
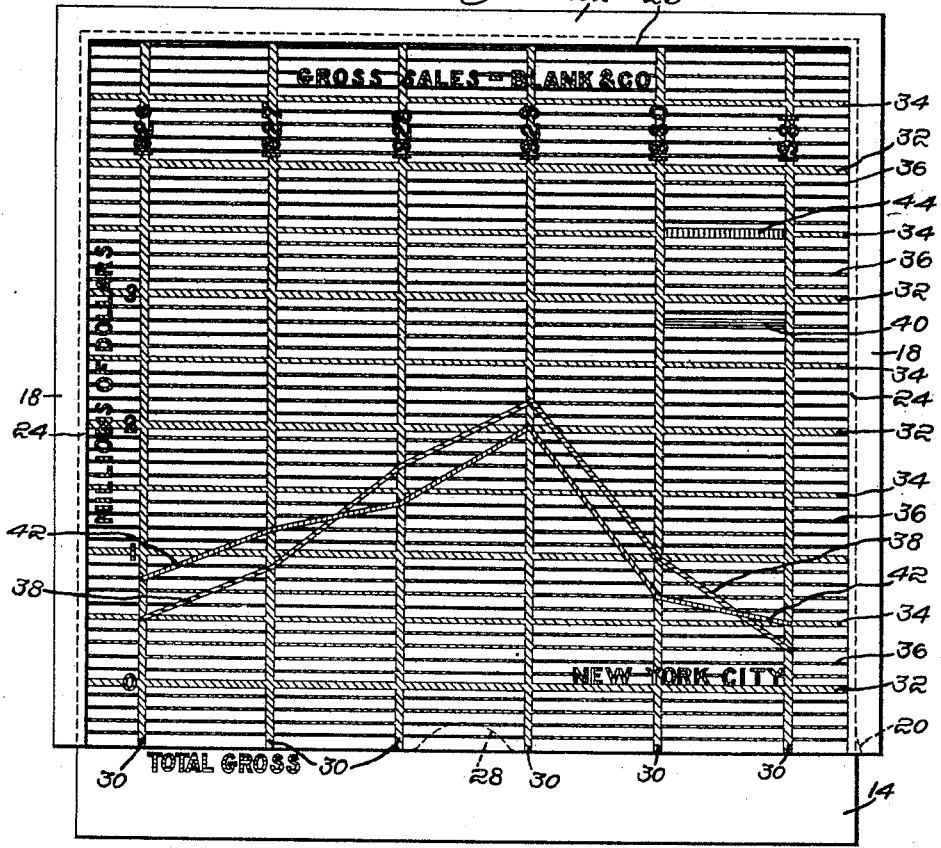
Fig. 7 is a plan similar to Fig. 1, but showing one of the plates shifted with relation to another and to the background to establish an average or mean between the "ordinates" of the graphs.

Fig. 6 shows the background and a single plate (the plate 16) placed thereon in the "normal" position so that the "curve" 42 may be interpreted by the aid of the background, and Fig. 7 shows the addition of the plate 14, so that the "curve" 38 may be compared with the "curve" 42 by the aid of the background. Fig. 7, however, shows the plate 14 lowered so as to enable a mean or average difference between the curves 38 and 42 to be obtained graphically, and in this case, the two "curves" cross each other at two points. A comparison of the lines 40 and 44 will show in money value what the average difference is.

Figure 8:
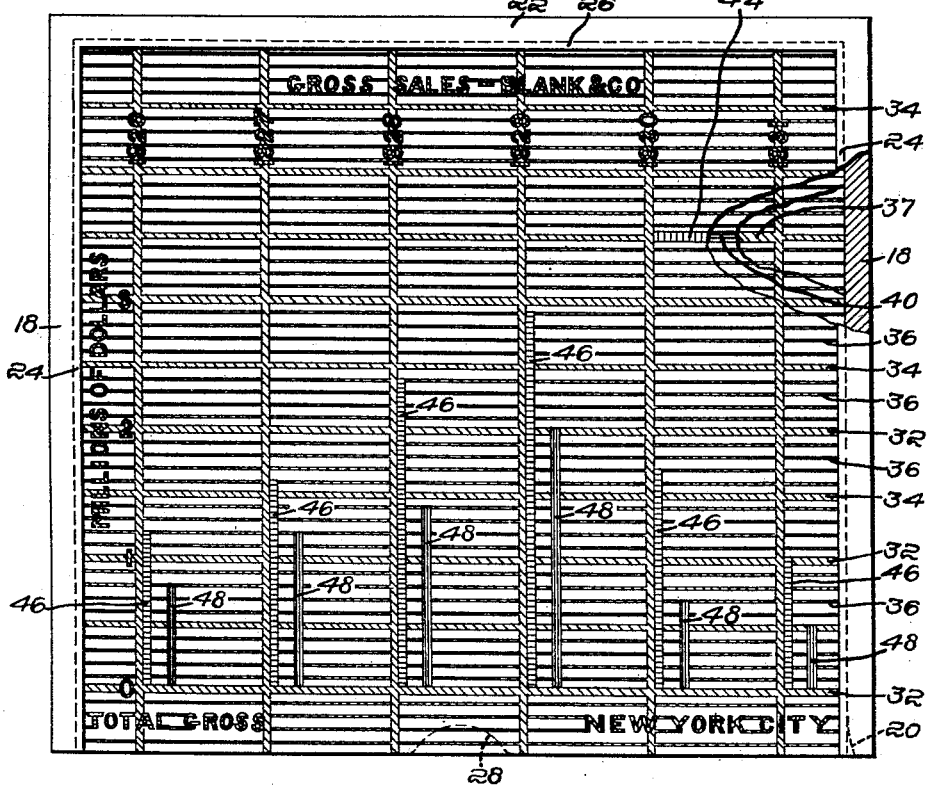
Fig. 8 is a plan of a modification in which the plates are provided with "bar" graphs instead of the "curve" graphs of the preceding figures.

Fig. 8 shows a changeable exhibitor precisely the same as that hereinbefore described except that I have substituted "bar" graphs for the "curves," the bars being vertical bars 46 on one plate and vertical bars 48 on another plate and out of alinement, horizontally, with the bars 46 so that one set of bars will not hide the other set.

It should, of course, be understood that the time divisions might be in a vertical direction and the money divisions in a horizontal direction, depending on the kind of comparison which is to be made. It should also be understood that the money and time factors are employed merely by way of example, and that other factors may be employed in a similar manner, as for example a comparison between production and sales, or between rainfall and crops harvested, and many other factors which are too numerous to require description.

Having thus described two embodiments of my invention, but without limiting myself thereto what I claim and desire by Letters Patent to secure is:

1. An apparatus providing for the visual comparison under conditions of differential adjustment of graphical representations of data, comprising a support having an extended supporting surface presenting a background delineated substantially throughout its area with a multiplicity of crossed lines defining a coordinate reference system, a plurality of transpicuous plates substantially free of coordinate designation and having delineated on each thereof an isolated graph computed in accordance with said system and representing the fluctuations of a variable, and means on the support for positioning such plates superposed on said background to be evaluated by reference to the lines of said system, including a guideway cooperating with an edge of the plates and along which the plates may selectively be slid only in a direction parallel to but one coordinate axis.

2. An apparatus providing for the visual comparison under conditions of differential adjustment of graphical representations of data, comprising a support having an extended supporting surface presenting a background delineated substantially throughout its area with a multiplicity of crossed lines defining a coordinate reference system, a plurality of transpicuous plates substantially free of coordinate designation and having delineated on each thereof an isolated graph computed in accordance with said system and representing the fluctuations of a variable, and means on the support for positioning such plates superposed on said background to be evaluated by reference to the lines of said system, including a guideway cooperating with an edge of the plates and along which the plates may selectively be slid only in a direction parallel to but one coordinate axis, said plates bearing remote from the graphs indicating marks corresponding in all of them to a fixed value of a coordinate and providing, in cooperation with a coordinate line serving as a reference point of the background, for positioning the plates in a zero position or in positions determinately varying therefrom.

3. In a changeable exhibitor for the study and comparison of statistical information in graphical form, the combination of a support presenting a guide and an abutment, a background on said support, said background being devoid of graphs and having thereon a coordinate reference system comprising two sets of coordinate lines, the first set being parallel with said guide and the second set being transverse to the first, and a transparent plate slidable upon said background and having an edge guided by said guide, and an edge which in one position of said plate engages said abutment and predetermines the relationship of said plate to said background in one direction lengthwise of said guide, said plate being devoid of coordinate lines and having thereon a two-dimensional graph computed in accordance with said system, one of the dimensions of said graph being lengthwise of said guide and the other transverse to said guide.

4. In a changeable exhibitor for the study and comparison of statistical information in graphical form, the combination of a support presenting a guide and an abutment, a background on said support, said background being devoid of graphs and having thereon a coordinate system comprising two sets of coordinate lines, the first set being parallel with said guide and the second set being transverse to the first, and a plurality of transparent plates slidable relatively to each other and to said background and each having an edge guided by said guide and an edge which in one position of such plate engages such abutment and predetermines the relationship of such plate to said background in one direction lengthwise of said guide, each plate being devoid of coordinate lines and having thereon a two-dimensional graph computed in accordance with said system and representing the fluctuations of a variable, one of the dimensions of said graph being lengthwise of said guide and the other transverse to said guide.

5. In a changeable exhibitor for the study and comparison of statistical information in graphical form, the combination of a support presenting a guide, a background on said support, said background being devoid of graphs and having thereon a coordinate system comprising two sets of coordinate lines, the first set being parallel with said guide and the second set being transverse to the first, and a plurality of transparent plates slidable relatively to each other and to said background and each having an edge guided by said guide, each plate being devoid of coordinate lines and having thereon a two dimensional graph computed in accordance with said system and representing the fluctuations of a variable, one of the dimensions of said graph being lengthwise of said guide and the other transverse to said guide, said background and said plates having registering marks which predetermine a normal starting point relationship between said graphs and the second set of coordinate lines and which, in the sliding of said plates, are out of registration with one another and provide an indication of the amount by which each graph is shifted in relationship to the second set of coordinate lines.

6. In a changeable exhibitor for the study and comparison of statistical information in graphical form, the combination of a support presenting a guide, a background on said support, said background being devoid of graphs and having thereon a coordinate system comprising two sets of coordinate lines, the first set being parallel with said guide and the second set being transverse to the first, and a plurality of transparent plates slidable relatively to each other and to said background and each having an edge guided by said guide, each plate being devoid of coordinate lines and having thereon a two-dimensional graph, computed in accordance with said system and representing the fluctuations of a variable, one of the dimensions of said graph being lengthwise of said guide and the other transverse to said guide, each graph having a different color from the other graph or graphs.

7. In a changeable exhibitor for the study and comparison of statistical information in graphical form, the combination of a support presenting a guide, a background on said support, said background being devoid of graphs and having thereon a coordinate system comprising two sets of coordinate lines, the first set being parallel with said guide and the second set being transverse to the first, and a plurality of transparent plates slidable relatively to each other and to said background and each having an edge guided by said guide, each plate being devoid of coordinate lines and having thereon a two-dimensional graph computed in accordance with said system and representing the fluctuations of a variable, one of the dimensions of said graph being lengthwise of said guide and the other transverse to said guide, each graph being of a different color from said coordinate lines, and each graph being a different color from the remaining graph or graphs.

WALTER F. BUCK.